US010439818B2

(12) United States Patent
Luo et al.

(10) Patent No.: US 10,439,818 B2
(45) Date of Patent: Oct. 8, 2019

(54) CAPTCHA IMAGE GENERATION METHOD AND APPARATUS, AND SERVER

(71) Applicant: TENCENT TECHNOLOGY (SHENZHEN) COMPANY LIMITED, Shenzhen (CN)

(72) Inventors: Bin Luo, Shenzhen (CN); Xin Hou, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 250 days.

(21) Appl. No.: 15/443,234

(22) Filed: Feb. 27, 2017

(65) Prior Publication Data

US 2017/0170967 A1 Jun. 15, 2017

Related U.S. Application Data

(63) Continuation of application No. PCT/CN2016/079418, filed on Apr. 15, 2016.

(30) Foreign Application Priority Data

Apr. 23, 2015 (CN) .......................... 2015 1 0197991

(51) Int. Cl.
*G06F 21/31* (2013.01)
*H04L 9/32* (2006.01)
(Continued)

(52) U.S. Cl.
CPC ............ *H04L 9/3239* (2013.01); *G06F 21/31* (2013.01); *G06F 21/36* (2013.01); *G06F 21/46* (2013.01);
(Continued)

(58) Field of Classification Search
CPC ..................................................... H04L 9/3239
See application file for complete search history.

(56) References Cited

U.S. PATENT DOCUMENTS 5,317,420 A * 5/1994 Kuwahara ................. G06T 5/20
348/667
8,209,743 B1 * 6/2012 Frank ....................... G09C 5/00
726/2
(Continued)

FOREIGN PATENT DOCUMENTS

CN 101183458 A 5/2008
CN 101923702 A 12/2010
(Continued)

OTHER PUBLICATIONS

The World Intellectual Property Organization (WIPO) International Search Report for PCT/CN2016/079418 dated Jul. 22, 2016 6 Pages.

*Primary Examiner* — Josnel Jeudy
(74) *Attorney, Agent, or Firm* — Anova Law Group, PLLC

(57) ABSTRACT

The present disclosure discloses a CAPTCHA image generation method and apparatus, and a server, relating to the field of computer technologies. According to the present disclosure, first noise points are generated on a CAPTCHA code in some regions of an initial image and second noise points are generated on a background of the image in another region, so that a machine cannot filter out the noise points in a CAPTCHA image by means of some simple algorithms, increasing difficulty in recognizing the CAPTCHA code by the machine, reducing a risk that the CAPTCHA code is cracked by the machine, and having a strong crack-proof capability.

18 Claims, 4 Drawing Sheets

(51) Int. Cl.
   *G06F 21/36* (2013.01)
   *G06F 21/46* (2013.01)
   *G09C 5/00* (2006.01)

(52) U.S. Cl.
   CPC .............. *G09C 5/00* (2013.01); *H04L 9/3226* (2013.01); *H04L 9/3247* (2013.01); *G06F 2221/2133* (2013.01)

(56) References Cited

U.S. PATENT DOCUMENTS

| | | | |
|---|---|---|---|
| 8,925,057 B1* | 12/2014 | Ansari | G06F 21/31 |
| | | | 382/181 |
| 2008/0301767 A1* | 12/2008 | Picard | G06T 1/0042 |
| | | | 726/2 |
| 2010/0182461 A1* | 7/2010 | On | H04N 9/045 |
| | | | 348/241 |
| 2011/0197268 A1 | 8/2011 | Ravikumar et al. | |
| 2011/0296509 A1* | 12/2011 | Todorov | G06F 21/36 |
| | | | 726/7 |
| 2014/0250538 A1* | 9/2014 | Rapaport | G06F 21/31 |
| | | | 726/28 |
| 2017/0170967 A1* | 6/2017 | Luo | G06F 21/36 |

FOREIGN PATENT DOCUMENTS

| | | |
|---|---|---|
| CN | 102298763 A | 12/2011 |
| CN | 102884509 A | 1/2013 |
| CN | 104852889 A | 8/2015 |

\* cited by examiner

CAPTCHA IMAGE GENERATION METHOD AND APPARATUS, AND SERVER

RELATED APPLICATION

This application claims priority to PCT Application No. PCT/CN2016/079418, filed on Apr. 15, 2016, which claims priority to Chinese Patent Application No. 201510197991.1, entitled "CAPTCHA IMAGE GENERATION METHOD AND APPARATUS" filed on Apr. 23, 2015, which are incorporated by reference in their entirety.

FIELD OF THE TECHNOLOGY

The present disclosure relates to the field of computer technologies, and in particular, to a CAPTCHA image generation method and apparatus, and a server.

BACKGROUND OF THE DISCLOSURE

Completely Automated Public Turing test to tell Computers and Humans Apart code (CAPTCHA), commonly referred to as CAPTCHA code, is a completely automated public procedure that can be used to tell whether a user is a machine or a person. To prevent a malicious user from using a machine to automatically perform operations such as login, information release and download, when the user performs a related operation, a server delivers a CAPTCHA image to a terminal of the user, and requests the user to enter a CAPTCHA code included in the CAPTCHA image to determine that the user that performs the operation is a person rather than a machine. Therefore, before delivering the CAPTCHA image to the terminal that is used by the user, the server needs to generate the CAPTCHA image first.

To avoid machine recognition, when the CAPTCHA image is generated, an initial image including the CAPTCHA code is generated first, and then noise scrambling is performed on the initial image to obtain the CAPTCHA image. Specifically, any one of the following ways may be included.

A first way to generate a CAPTCHA image may include the steps to: Obtain the initial image including the CAPTCHA code; and generate noise points in a whole image region of the initial image to obtain the CAPTCHA image.

A second way to generate a CAPTCHA image may include the steps: Obtain the initial image including the CAPTCHA code; and generate noise points on the CAPTCHA code of the initial image to obtain the CAPTCHA image.

Generally, noise points on a whole CAPTCHA image can be well filtered out by means of a median filtering method. Therefore, when a whole image region of the CAPTCHA image includes the noise points, a machine can filter out the noise points on the CAPTCHA image by means of the median filtering method, and can recognize a CAPTCHA code in the CAPTCHA image. In addition, an expansion algorithm in an image processing field has a good adhesion effect, so that the machine can easily filter out, by means of the expansion algorithm, the noise points that are generated on the CAPTCHA code, to recognize the CAPTCHA code in the CAPTCHA image. Based on the above, the CAPTCHA image that is generated by means of the above two manners has a high risk of being cracked by the machine, and has a poor crack-proof capability.

SUMMARY

To reduce a risk of being cracked by a machine and improve a crack-proof capability, embodiments of the present invention provide a CAPTCHA image generation method and apparatus, and a server. The technical solutions are as follows:

According to a first aspect, a CAPTCHA image generation method is provided, including obtaining an initial image including a CAPTCHA code; selecting a first region in the initial image, the first region including at least one part of content of the CAPTCHA code; generating first noise points on the CAPTCHA code included in the first region; and generating second noise points in a second region of the initial image to obtain a CAPTCHA image, the second region being a region outside the first region of the initial image.

According to a second aspect, a CAPTCHA image generation apparatus is provided, including: an obtaining module, configured to obtain an initial image including a CAPTCHA code; a selection module, configured to select a first region in the initial image, the first region including at least one part of content of the CAPTCHA code; a first generation module, configured to generate first noise points on the CAPTCHA code included in the first region; and a second generation module, configured to generate second noise points in a second region of the initial image to obtain a CAPTCHA image, the second region being a region outside the first region of the initial image.

According to a third aspect, a server is provided, including: one or more processors; and a memory, one or more programs being stored in the memory, and the one or more programs being configured to be executed by the one or more processors, and including an instruction that is used to perform the following operations: obtaining an initial image including a CAPTCHA code; selecting a first region in the initial image, the first region including at least one part of content of the CAPTCHA code; generating first noise points on the CAPTCHA code included in the first region; and generating second noise points in a second region of the initial image to obtain a CAPTCHA image, the second region being a region outside the first region of the initial image.

The technical solutions provided in the embodiments of the present invention bring the following beneficial effects.

First noise points are generated on a CAPTCHA code in same regions of an initial image and second noise points are generated cm a background of the image in another region, so that a machine cannot filter out the noise points in a CAPTCHA image by means of some simple algorithms, increasing difficulty in recognizing the CAPTCHA code by the machine, reducing a risk that the CAPTCHA code is cracked by the machine, and having a strong crack-proof capability.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objective, technical solutions, and advantages of the present disclosure clearer, the following further describes implementation manners of the present disclosure in detail with reference to the accompanying drawings.

Figure 1:
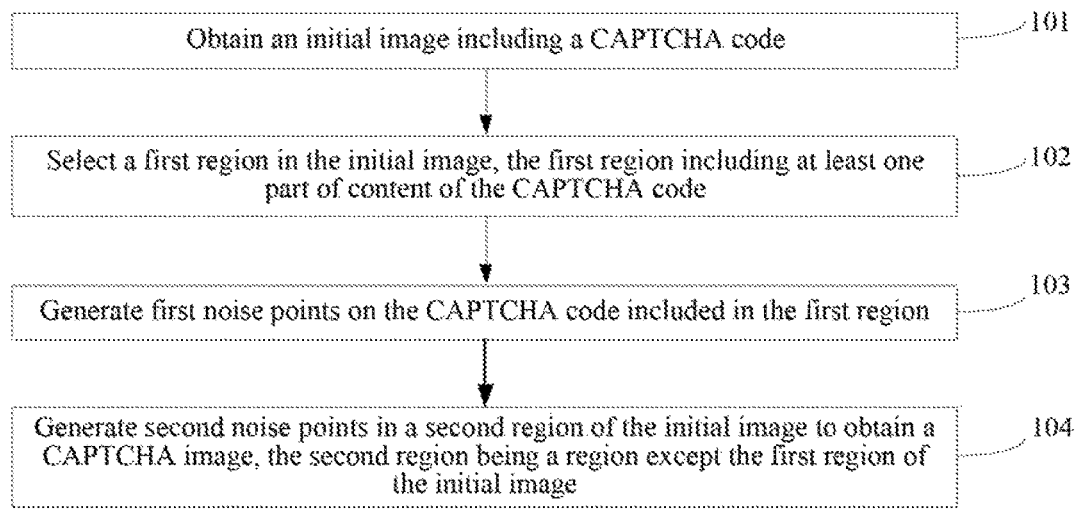
FIG. 1 is a flowchart of a CAPTCHA image generation method according to an embodiment of the present invention.

FIG. 1 is a flowchart of a CAPTCHA image generation method according to an embodiment of the present invention. Referring to FIG. 1, the CAPTCHA image generation method provided in this embodiment of the present invention includes the following steps.

101: Obtain an initial image including a CAPTCHA code.

102: Select a first region in the initial image, the first region including at least one part of content of the CAPTCHA code.

103: Generate first noise points on the CAPTCHA code included in the first region.

104: Generate second noise points in a second region of the initial image to obtain a CAPTCHA image, the second region being a region outside the first region of the initial image.

According to the method provided in this embodiment of the present invention, first noise points are generated on a CAPTCHA code in some regions of an initial image and second noise points are generated on a background of the image in another region, so that a machine cannot filter out the noise points in a CAPTCHA image by means of some simple algorithms, increasing difficulty in recognizing the CAPTCHA code by the machine, reducing a risk that the CAPTCHA code is cracked by the machine, and having a strong crack-proof capability.

In another embodiment, the generating first noise points on the CAPTCHA code included in the first region includes: randomly selecting multiple first pixels on the CAPTCHA code included in the first region; and rendering the multiple first pixels into a first color to obtain the first noise points, where the first color is different from a color of the CAPTCHA code in the first region.

In another embodiment, the randomly selecting multiple first pixels on the CAPTCHA code included in the first region includes; generating a random number according to a specified random function when an pixel is selected; determining whether the random number is greater than a specified value; and using the pixel as a first pixel when the random number is greater than the specified value.

In another embodiment, the generating second noise points in a second region of the initial image includes: randomly selecting multiple second pixels in the second region of the initial image; and rendering the multiple second pixels into a second color to obtain the second noise points, where the second color is different from a color of the second region.

In another embodiment, after the CAPTCHA image is obtained, the method further includes: generating a signature of the CAPTCHA code by using a specified encryption algorithm, where the signature is used to determine whether an answer that is submitted by a user according to the CAPTCHA image matches the CAPTCHA code.

All the above optional technical solutions may be arbitrarily combined to form optional embodiments of the present invention, and are not described in detail herein again.

Figure 2:
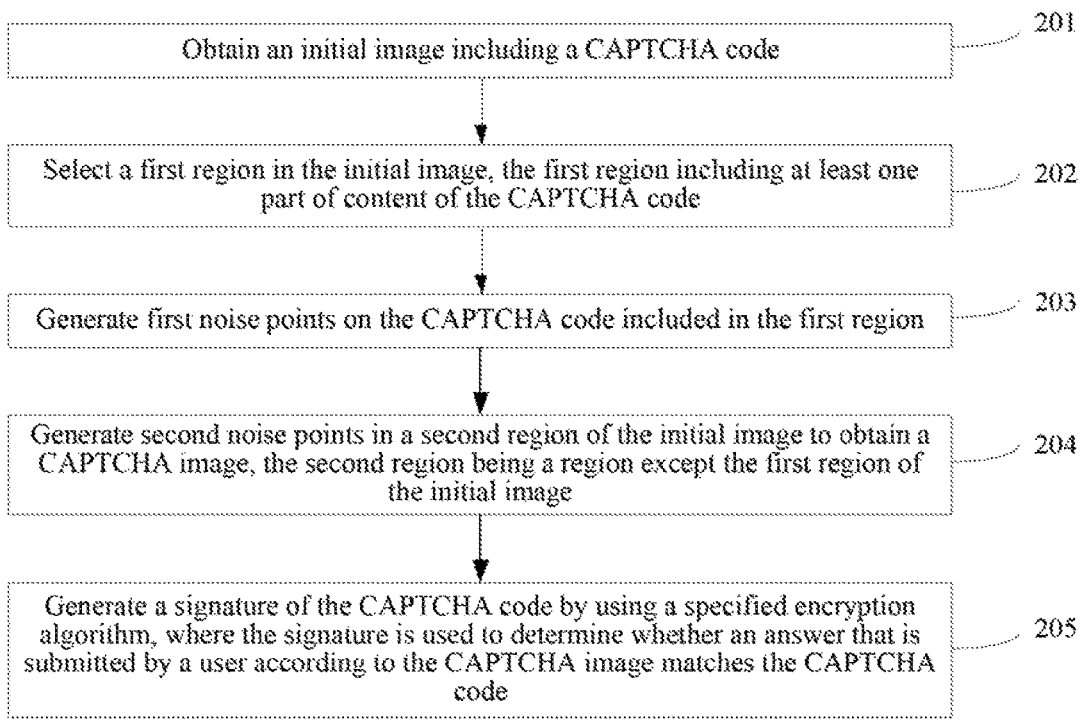
FIG. 2 is a flowchart of a CAPTCHA image generation method according to another embodiment of the present invention.

With reference to the content of the embodiment that corresponds to FIG. 1. FIG. 2 is a flowchart of a CAPTCHA image generation method according to another embodiment of the present invention. Referring to FIG. 2, a process of the method provided in this embodiment of the present invention includes the following steps.

201: Obtain an initial image including a CAPTCHA code.

When an initial image including a CAPTCHA code is obtained, an image may be first obtained arbitrarily, and then the CAPTCHA code that is preset or that is randomly generated is added to the image to obtain the initial image. Specifically, to facilitate subsequent recognition of the CAPTCHA code in a CAPTCHA image by a user, a background color of the image that is obtained arbitrarily may be a pure color. For example, the image may be a white image, or may be a pink image.

In addition, a type of the CAPTCHA code is not specifically limited in this embodiment of the present invention. For example, the CAPTCHA code may be any one of Chinese characters, letters or digits. For example, the CAPTCHA code may be a digital CAPTCHA code, may be a letter CAPTCHA code or the like. In addition, the CAPTCHA code may further be a combination of at least two of the Chinese characters, the letters or the digits. For example, the CAPTCHA code may further be a combination of the letters and the digits, may be a combination of the letters and the Chinese characters, may be a combination of the letters, the digits, and the Chinese characters or the like.

Furthermore, a color of the CAPTCHA code is not specifically limited in this embodiment of the present invention either. For example, the CAPTCHA code may be in black, blue, or the like, as long as it is ensured that the color of the CAPTCHA code is different from a background color of the image that is obtained. When the CAPTCHA code includes multiple letters, colors of the letters may be the same, or may be different. In addition, colors of regions of each letter may be the same, or may be different.

202: Select a first region in the initial image, the first region including at least one part of content of the CAPTCHA code.

There may be multiple manners to select the first region in the initial image. For example, a region may be randomly selected in the initial image as the first region. Alternatively, a region that is selected by a user in the initial image is obtained and used as the first region, or the like.

In addition, according to this embodiment of the present invention, when the CAPTCHA image is generated, the selected first region includes a part or all of content of the CAPTCHA code. For example, if the CAPTCHA code in the initial image includes totally four letters, the first region may include one letter, two letters, a partial region of one letter, or the like. Of course, in another embodiment, the first region may further include all of the four letters.

Furthermore, a shape of the first region is not limited in this embodiment of the present invention. For example, the first region may be a circular region, an elliptical region, a rectangular region or the like. An area of the first region is not limited in this embodiment of the present invention, and the first region only needs to be a sub-region of the initial image.

203: Generate first noise points on the CAPTCHA code included in the first region.

To increase difficulty in machine recognition, according to this embodiment of the present invention, when the CAPTCHA image is generated, the difficulty is increased by generating some noise points in the initial image. For convenience of description, the noise points generated on the CAPTCHA code included in the first region are referred to as the first noise points.

A manner of generating the first noise points on the CAPTCHA code included in the first region is implemented, including but not limited to, by means of step 2031 and step 2032 described below.

2031; Randomly select multiple first pixels on the CAPTCHA code included in the first region.

A quantity of the first pixels is not specifically limited in this embodiment of the present invention, for example, the quantity of the first pixels may account for a specified percentage of a total quantity of pixels in the CAPTCHA code included in the first region. The specified percentage may be fifty percent, thirty percent, or the like.

When the multiple first pixels are randomly selected in the CAPTCHA code included in the first region, to control the quantity of the first pixels, a random number may be generated when a pixel is selected, and whether the pixel is used as a first pixel is determined according to a relationship between the random number and a specified value.

Specifically, when the pixel is randomly selected, a random number may be generated according to a specified random function, and whether the random number is greater than the specified value is determined and the pixel is used as a first pixel when the random number is greater than the specified value.

The specified random function may be a function that can generate a number ranging from 1 to 100, may be a function that can generate a value between 0 and 1 or the like. In addition, the specified value is related to the specified random function and the specified percentage. For example, when the specified percentage is fifty percent, and the random function is the function that can generate a number ranging from 1 to 100, the specified value may be 50 or the like. When the specified random function is the function that can generate a value between 0 and 1, and the specified percentage is thirty percent, the specified value may be 0.3 or the like.

2032: Render the multiple first pixels into a first color to obtain the first noise points, where the first color is different from a color of the CAPTCHA code in the first region.

When the multiple first pixels are rendered into the first color, RGB values of the multiple first pixels may be converted into RGB values of the first color. For example, for the first color, if R=125, G=56, and B=72, the color of the multiple first pixels may be converted from a color of the CAPTCHA code on the initial image into that of a pixel whose R is 125, G is 56, and B is 72.

A specific color type of the first color is not specifically limited in this embodiment of the present invention. To disturb machine recognition, the first color is different from the color of the CAPTCHA code in the first region. For example, when the color of the CAPTCHA code on the initial image is black and the background color is white; multiple first pixels may be rendered into pink, white, or the like.

204: Generate second noise points in a second region of the initial image to obtain a CAPTCHA image, the second region being a region outside the first region of the initial image.

The second noise points in the second region of the initial image are generated, including but not limited to, by means of step 2041 and step 2042 described below.

2041: Randomly select multiple second pixels in the second region of the initial image.

A principle of this step is consistent with that of step 2031. Refer to the content, of step 2031 for details, and the details are not described herein again.

2042: Render the multiple second pixels into a second color to obtain the second noise points, where the second color is different from a color of the second region.

A principle of this step is consistent with that of step 2032. Refer to the content of step 2032 for details, and the details are not described herein again.

A format of the CAPTCHA image is not specifically limited in this embodiment of the present invention. Specifically, the format of the CAPTCHA image includes but not limited to any one of JPEG (Joint Photographic Experts Group), PNG (Portable Network Graphic Format), GIF (Graphic Interchange Format), or BMP (Bitmap).

It should be noted that, this embodiment of the present invention is described only by using an example in which the first noise points are first generated on the CAPTCHA code included in the first region before the second noise points are generated in the second region. However, during specific implementation, the second noise points may also be first generated in the second region before the first noise points are generated on the CAPTCHA code included in the first region; or the first noise points may be generated on the CAPTCHA code included in the first region and simultaneously the second noise points may be generated in the second region. An execution order of the step is not specifically limited in the present disclosure.

For ease of understanding, the CAPTCHA image generation method provided in this embodiment of the present invention is described by using a specific example below.

For example, if a background color of an initial image is black and a color of a CAPTCHA code is white, a circular region including a part of the CAPTCHA code may be first randomly obtained as a first region, and then multiple first pixels on the CAPTCHA code included in the first region are rendered into black, and multiple second pixels in a second region except the first region of the initial image are rendered into white. By means of these steps, noise points are added to the CAPTCHA code in any first region of the initial image and are added to the second region.

Figure 3:
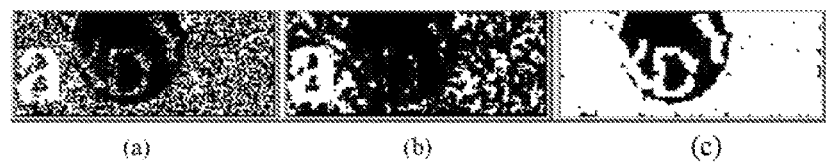
FIG. 3 is a schematic diagram of a CAPTCHA image according to another embodiment of the present invention.

FIG. 3 is a schematic diagram of a CAPTCHA image according to another embodiment of the present invention. As shown in FIG. 3, a background color of an initial image is black, a color of a CAPTCHA code is white, and the CAPTCHA image that is generated by means of step 201 to step 204 is shown in (a) in FIG. 3. An image that is obtained after the CAPTCHA image is processed by means of a median filtering method is shown in (b) in FIG. 3. An image that is obtained after the CAPTCHA image is processed by means of an expansion algorithm is shown in (c) in FIG. 3. It can be learned from (b) and (c) in FIG. 3 that, for the CAPTCHA image that is obtained by means of the method provided in this embodiment of the present invention, it is difficult to filter out the noise points in the CAPTCHA image by means of the median filtering method and the expansion algorithm to obtain the CAPTCHA code, and therefore, the CAPTCHA code is difficult to be recognized by a machine, increasing a crack-proof capability of the CAPTCHA image. Furthermore, when the CAPTCHA image is used to authenticate an operation of a user, it can be ensured that the operator is a natural person rather than a machine, thereby improving security of the operation.

Furthermore, after step 204, the generated CAPTCHA image can be applied to authenticate a user, and an authentication process may include: providing the CAPTCHA image to the user, and authenticating an answer that is submitted by the user according to the CAPTCHA image after the answer is received, where the authentication succeeds if the answer is consistent with the CAPTCHA code, or the authentication fails if the answer is inconsistent with the CAPTCHA code. The CAPTCHA image that is generated by means of the above steps is applied to other authentication situations such as identity authentication, so that authentication security is greatly improved, and attacks of malicious users are reduced.

205: Generate a signature of the CAPTCHA code by using a specified encryption algorithm where the signature is used to determine whether an answer that is submitted by a user according to the CAPTCHA image matches the CAPTCHA code.

The specified encryption algorithm includes but not limited to an MD5 (Message-Digest Algorithm 5) or the like. A type of the specified encryption algorithm is not limited in this embodiment of the present invention.

Specifically, after the signature of the CAPTCHA code is generated by means of the specified encryption algorithm, when the CAPTCHA image is used to authenticate the user, after the answer is submitted by the user according to the CAPTCHA image, the specified encryption algorithm can be used to calculate a signature of the answer submitted by the user, and whether the signature of the answer submitted by the user matches the signature of the CAPTCHA code is determined. If the signature of the answer submitted by the user matches the signature of the CAPTCHA code, it is determined that the user is successfully authenticated; and if the signature of the answer submitted by the user does not match the signature of the CAPTCHA code, it is determined that the user is unsuccessfully authenticated.

Furthermore, the CAPTCHA image that is generated by means of the method provided in this embodiment of the present invention can be applied to any authentication situation to determine whether an executor of the operation is a natural person or a machine. For example, the CAPTCHA image can be applied to the situations such as login, posting, and message reply, making a comment, downloading a file, and voting. A situation in which the CAPTCHA image is used is not specifically limited in this embodiment of the present invention.

Figure 4:
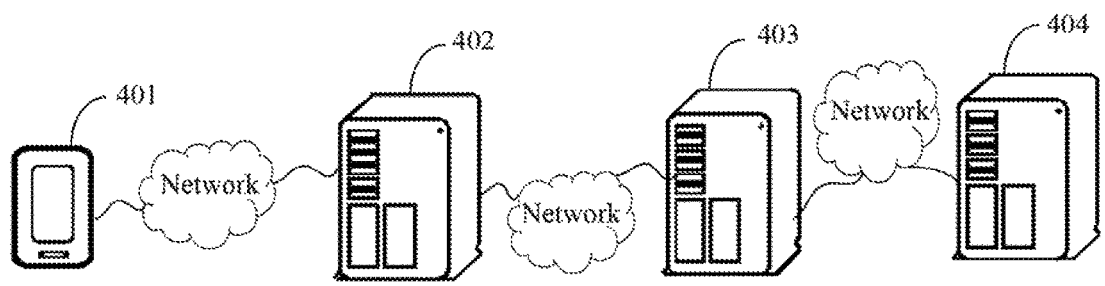
FIG. 4 is a schematic diagram of an application environment of a CAPTCHA image generation method according to another embodiment of the present invention.

As shown in FIG. 4, FIG. 4 is a schematic diagram of an application environment of a CAPTCHA image generation method. As shown in FIG. 4, the application environment includes a terminal 401, a web server 402, a CAPTCHA server 403, and a CAPTCHA image generation server 404. The terminal 401 and the web server 402, the web server and the CAPTCHA server 403, and the CAPTCHA server 403 and the CAPTCHA image generation server 404 are connected to each other by using a network. The network may be a wired network, or may be a wireless network.

In combination with the application environment, an innovation is performed on the CAPTCHA image generation server 404 in this embodiment of the present invention, to enable the CAPTCHA image generation server 404 to generate multiple CAPTCHA images by means of step 201 to step 204. In addition, the CAPTCHA server 403 can be configured to generate a signature that corresponds to a CAPTCHA code in each of the CAPTCHA images that are generated by means of step 205. Of course, the signature may also be generated by the CAPTCHA image generation server 404.

Specifically, when a user corresponding to the terminal 401 performs an operation such as a login operation or a voting operation, the user can access the web server 402 by operating a corresponding URL (Uniform Resource Locator). After the web server 402 determines the user's access operation, the web server 402 requests a CAPTCHA image from the CAPTCHA server 403. In this case, the CAPTCHA server 403 pulls a CAPTCHA image from CAPTCHA images that are generated by the CAPTCHA image generation server 404, generates a signature of a CAPTCHA code included in the CAPTCHA image, and sends the CAPTCHA image to the web server 402. The web server 402 sends the CAPTCHA image to the terminal 401. After the terminal 401 receives the CAPTCHA image and then obtains a CAPTCHA code that is entered by the user according to the CAPTCHA image, the terminal 401 submits the CAPTCHA code to the web server 402, and the web server 402 submits the CAPTCHA code to the CAPTCHA server 403. After the CAPTCHA server 403 receives the CAPTCHA code that is entered by the user, the CAPTCHA server 403 generates, by means of a specified encryption algorithm, a signature corresponding to the CAPTCHA code that is entered by the user, where the specified encryption algorithm is the same as a specified encryption algorithm that is used when the CAPTCHA server 403 generates the signature of the CAPTCHA code. Next, the CAPTCHA server 403 performs matching between the signature corresponding to the CAPTCHA code that is entered by the user and the signature of the CAPTCHA code included in the CAPTCHA image, and determines that the user executing the operation is a person rather than a machine when the CAPTCHA server 403 determines that the signature corresponding to the CAPTCHA code that is entered by the user matches the signature of the CAPTCHA code included in the CAPTCHA image. In this case, the user corresponding to the terminal 401 can execute the operation.

Of course, the above process is described only by using an example in which a CAPTCHA process is implemented by the different servers in coordination. However, during specific implementation, functions of the servers can also be integrated into one server, and the CAPTCHA process can be implemented by the integrated server. For example, the CAPTCHA image generation server 404 or the CAPTCHA server 403 may integrate the functions of the servers, and execute the CAPTCHA process.

In addition, the terminal 401 may be a desktop computer, a smartphone, a tablet computer, an e-book reader, an MP3 (Moving Picture Experts Group Audio Layer III) player, an MP4 (Moving Picture Experts Group Audio Layer IV) player, a portable laptop computer, a wearable device such as a smart band, or the like.

According to the method provided in this embodiment of the present invention, first poise points are generated on a CAPTCHA code in some regions of an initial image and second noise points are generated on a background of the image in another region, so that a machine cannot filter out the noise points in a CAPTCHA image by means of some simple algorithms, increasing difficulty in recognizing the CAPTCHA code by the machine, reducing a risk that the CAPTCHA code is cracked by the machine, and having a strong crack-proof capability.

Figure 5:
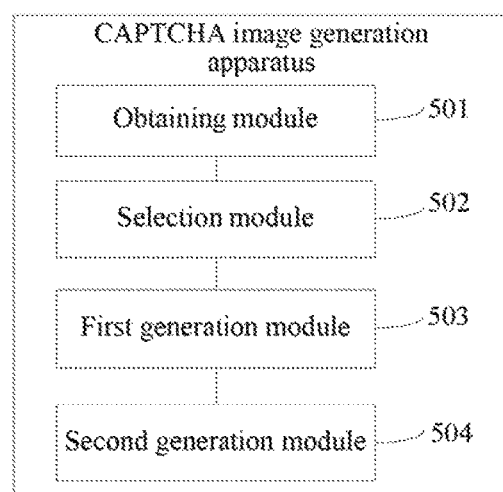
FIG. 5 is a schematic structural diagram of a CAPTCHA image generation apparatus according to another embodiment of the present invention.

FIG. 5 is a schematic structural diagram of a CAPTCHA image generation apparatus according to another embodiment of the present invention. The CAPTCHA image generation apparatus is configured to execute the CAPTCHA image generation method provided in the embodiment corresponding to FIG. 1 or FIG. 2. In the present disclosure, a module may refer to one or more computer programs stored in computer readable media. When executed by one or more processors, the one or more computer programs perform the functions of the corresponding module as described.

Referring to FIG. 5, the CAPTCHA image generation apparatus includes: an obtaining module 501, configured to obtain an initial image including a CAPTCHA code; a selection module 502, configured to select a first region in the initial image, the first region including at least one part of content of the CAPTCHA code; a first generation module 503, configured to generate first noise points on the CAPTCHA code included in the first region; and a second generation module 504, configured to generate second noise points in a second region of the initial image to obtain a CAPTCHA image, the second region being a region outside the first region of the initial image.

According to the apparatus provided in this embodiment of the present invention, first noise points are generated on a CAPTCHA code in some regions of an initial image and second noise points are generated on a background of the image in another region, so that a machine cannot filter out the noise points in a CAPTCHA image by means of some simple algorithms, increasing difficulty in recognizing the CAPTCHA code by the machine, reducing a risk that the CAPTCHA code is cracked by the machine, and having a strong crack-proof capability.

Figure 6:
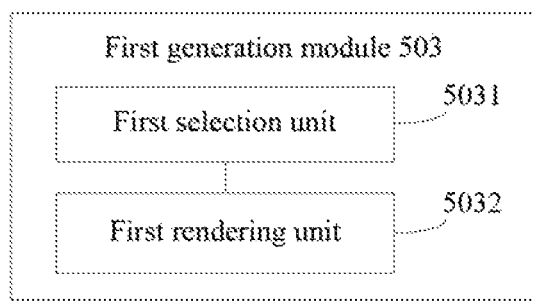
FIG. 6 is a schematic structural diagram of a first generation module according to another embodiment of the present invention.

In another embodiment, referring to FIG. 6, a first generation module 503 includes: a first selection unit 5031, configured to randomly select multiple first pixels on a CAPTCHA code included in a first region; and a first rendering unit 5032, configured to render the multiple first pixels into a first color to obtain first noise points, where the first color is different from a color of the CAPTCHA code in the first region.

Figure 7:
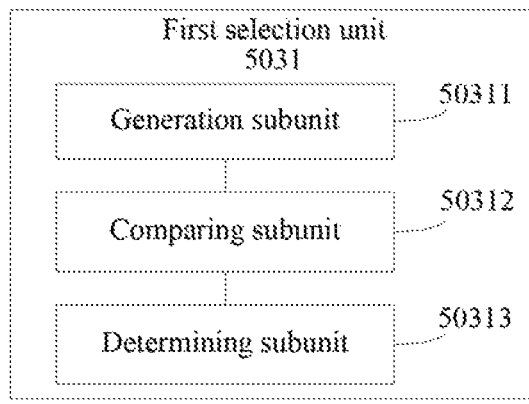
FIG. 7 is a schematic structural diagram of a first selection unit according to another embodiment of the present invention.

In another embodiment, referring to FIG. 7, a first selection unit 5031 includes: a generation subunit 50311, configured to generate a random number according to a specified random function when a pixel is selected; a comparing subunit 50312, configured to determine whether the random number is greater than a specified value, and a determining subunit 50313, configured to use the pixel as a first pixel when the random number is greater than the specified value.

Figure 8:
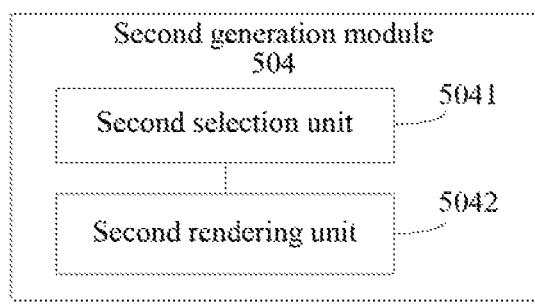
FIG. 8 is a schematic structural diagram of a second generation module according to another embodiment of the present invention.

In another embodiment, referring to FIG. 8, a second generation module 504 includes: a second selection unit 5041, configured to randomly select multiple second pixels in the second region of the initial image: and a second rendering unit 5042, configured to render the multiple second pixels into a second color to obtain second noise points, where the second color is different from a color of the second region.

Figure 9:
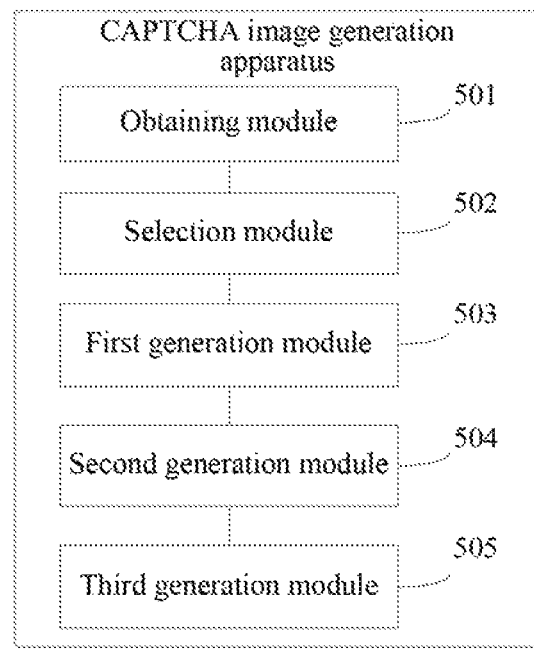
FIG. 9 is a schematic structural diagram of a CAPTCHA image generation apparatus according to another embodiment of the present invention.

In another embodiment, referring to FIG. 9, a CAPTCHA image generation apparatus further includes: a third generation module 505, configured to generate a signature of a CAPTCHA code by using a specified encryption algorithm, where the signature is used to determine whether an answer that is submitted by a user according to a CAPTCHA image matches the CAPTCHA code.

It should be noted that, when the CAPTCHA image generation apparatus provided in this embodiment generates a CAPTCHA image, division of the functional modules is merely used as an example for description. In practical application, the functional allocation can be implemented by different functional modules according to needs. That is, an internal structure of the apparatus is divided into different functional modules to implement all or part of functions described above. In addition, the CAPTCHA image generation apparatus and the server that are provided in the foregoing embodiments and the embodiment of the CAPTCHA image generation method belong to a same concept. Refer to the method embodiment for a specific implementation process, and details are not described herein again.

Figure 10:
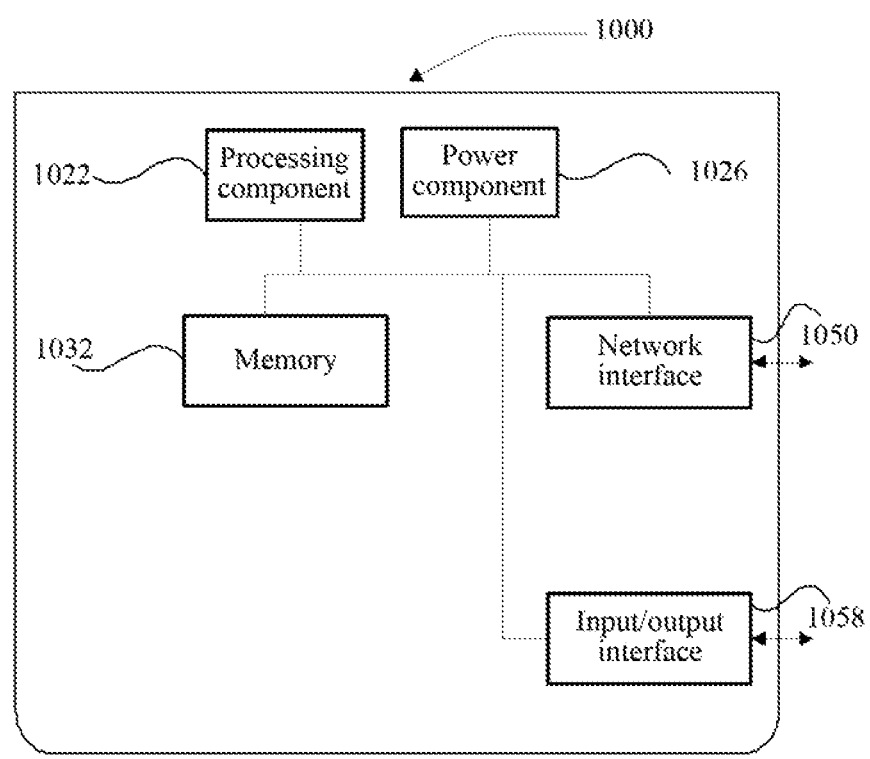
FIG. 10 is a schematic structural diagram of a server according to another embodiment of the present invention.

FIG. 10 is a schematic structural diagram of a server according to an example of an embodiment. The server is configured to execute the CAPTCHA image generation method provided in the embodiment corresponding to FIG. 1 or FIG. 2. Referring to FIG. 10, the server 1000 includes a processing component 1022 that further includes one or more processors and a memory resource that is represented by a memory 1032 and is configured to store an instruction that is executed by the processing component 1022 such as an application program. The application program that is stored in the memory 1032 may include one or more modules that each correspond to a set of instructions. In addition, the processing component 1022 configured to execute the instruction, to execute the CAPTCHA image generation method provided in the embodiment corresponding to FIG. 1 or FIG. 2.

The server 1000 may further include a power component 10210 that is configured to execute power management of the server 1000, a wired or wireless network interface 1050 that is configured to connect the server 1000 to a network, and an input/output (I/O) interface 1058. The server 1000 can operate an operation system that is stored in the memory 1032, for example, Windows Server™, Mac OS X™, Unix™, Linux™, FreeBSD™, or the like.

One or more programs are stored in the memory, and are configured to be executed by one or more processors. The one or more programs include an instruction that is used to perform the following operations: obtaining an initial image including a CAPTCHA code; selecting a first region in the initial image, the first region including at least one part of content of the CAPTCHA code; generating first noise points on the CAPTCHA code included in the first region; and generating second noise points in a second region of the initial image to obtain the CAPTCHA image, the second region being a region outside the first region of the initial image.

Assuming that the above is a first possible implementation manner, in a second possible implementation manner that is provided based on the first possible implementation manner, the memory of the server further includes an instruction that is used to perform the following operation: generating first noise points on the CAPTCHA code included in the first region, including: randomly selecting multiple first pixels on the CAPTCHA code included in the first region; and rendering the multiple first pixels into a first color to obtain the first noise points, where the first color is different from a color of the CAPTCHA code in the first region.

In a third possible implementation manner that is provided based on the second possible implementation manner, the memory of the server further includes an instruction that is used to perform the following operation: randomly selecting multiple first pixels on the CAPTCHA code included in the first region, including: generating a random number according to a specified random function when an pixel is selected; determining whether the random number is greater than a specified value; and using the pixel as a first pixel when the random number is greater than the specified value.

In a fourth possible implementation manner that is provided based on the first possible implementation manner, the memory of the server further includes an instruction that is used to perform the following operation: generating second noise points in a second region of the initial image, including: randomly selecting multiple second pixels in the second region of the initial image; and rendering the multiple second pixels into a second color to obtain the second noise points, where the second color is different from a color of the second region.

In a fifth possible implementation manner that is provided based on any one of the first to the fourth possible implementation manners, the memory of the server further includes an instruction that is used to perform the following operation: after the CAPTCHA image is obtained, further including: generating a signature of the CAPTCHA code by using a specified encryption algorithm, where the signature is used to determine whether an answer that is submitted by a user according to the CAPTCHA image matches the CAPTCHA code.

According to the server provided in this embodiment of the present invention, first noise points are generated on a CAPTCHA code included in a first region selected in an initial image and second noise points are generated in a second region except the first region in the initial image, so that a machine cannot filter out the noise points in a CAPTCHA image by means of some simple algorithms, increasing difficulty in recognizing the CAPTCHA code by the machine, reducing a risk that the CAPTCHA code is cracked by the machine, and having a strong crack-proof capability.

It may be understood by a person of ordinary skill in the art that, all or part of the embodiments can be implemented by means of hardware, or may be implemented by related hardware that is instructed by means of a program, where the program can be stored in a computer readable storage medium. The storage medium may be a read-only memory, a disk, an optical disk, or the like.

In an example of an embodiment, a non-transitory computer readable storage medium including instructions is further provided, for example, a memory including instructions. The instructions may be executed by a processor in a terminal to complete the CAPTCHA image generation method shown in an, embodiment of FIG. 2 or an embodiment of FIG. 3. For example, the non-transitory computer readable storage medium may be a ROM, a random access memory (RAM), a CD-ROM, a magnetic tape, a floppy disk, an optical data storage device, or the like.

The above are only preferred embodiments of the present invention and are not intended to limit the present invention. Any variations, equal replacements, improvements, or the like that are made within the spirit and scope of the present disclosure shall fall within the protection scope of the present disclosure.

What is claimed is:

1. A CAPTCHA image generation method, comprising:
    obtaining an initial image comprising a CAPTCHA code;
    selecting a first region in the initial image, the first region comprising a first part of content of the CAPTCHA code;
    generating first noise points on the CAPTCHA code in the first region using a first noise generation scheme, the first noise generation scheme including rendering multiple first pixels having a second color in the first region into a first color;
    generating second noise points in a second region of the initial image using a second noise generation scheme different from the first noise generation scheme, the second region of the initial image being a region outside the first region of the initial image, the second region comprising a second part of content of the CAPTCHA code, the second noise generation scheme includes rendering multiple second pixels having the first color in the second region into the second color; and
    obtaining a CAPTCHA image by combining the first region having the first noise points and the second region having the second noise points.

2. The method according to claim 1, wherein the generating first noise points on the CAPTCHA code in the first region comprises:
    randomly selecting the multiple first pixels on the CAPTCHA code in the first region; and
    rendering the multiple first pixels into the first color to obtain the first noise points, wherein the first color is different from a color of the CAPTCHA code in the first region.

3. The method according to claim 2, wherein the randomly selecting multiple first pixels on the CAPTCHA code in the first region comprises:
    generating a random number according to a specified random function when a pixel is selected;
    determining whether the random number is greater than a specified value; and
    using the pixel as one of the first pixels when the random number is greater than the specified value.

4. The method according to claim 1, wherein the generating second noise points in a second region of the initial image comprises:
    randomly selecting the multiple second pixels in the second region of the initial image; and
    rendering the multiple second pixels into the second color to obtain the second noise points, wherein the second color is different from a color of the second region.

5. The method according to claim 1, wherein after the CAPTCHA image is obtained, the method further comprises:
    generating a signature of the CAPTCHA code by using a specified encryption algorithm, wherein the signature is used to determine whether an answer that is submitted by a user according to the CAPTCHA image matches the CAPTCHA code.

6. A CAPTCHA image generation apparatus, comprising:
a memory; and
a processor coupled to the memory and configured to:
obtain an initial image comprising a CAPTCHA code;
select a first region in the initial image, the first region comprising a first part of the CAPTCHA code;
generate first noise points on the CAPTCHA code in the first region using a first noise generation scheme, the first noise generation scheme including rendering multiple first pixels having a second color in the first region into a first color;
generate second noise points in a second region of the initial image using a second noise generation scheme different from the first noise generation scheme, the second region of the initial image being a region outside the first region of the initial image, the second region comprising a second part of content of the CAPTCHA code, the second noise generation scheme includes rendering multiple second pixels having the first color in the second region into the second color; and obtain a CAPTCHA image by combining the first region having the first noise points and the second region having the second noise points.

7. The apparatus according to claim 6, wherein the processor is further configured to:
  randomly select multiple the first pixels on the CAPTCHA code in the first region; and
  render the multiple first pixels into the first color to obtain the first noise points, wherein the first color is different from a color of the CAPTCHA code in the first region.

8. The apparatus according to claim 7, wherein the processor is further configured to:
  generate a random number according to a specified random function when a pixel is selected;
  determine whether the random number is greater than a specified value; and
  use the pixel as one of the first pixels when the random number is greater than the specified value.

9. The apparatus according to claim 6, wherein the processor is further configured to:
  randomly select the multiple second pixels in the second region of the initial image; and
  render the multiple second pixels into the second color to obtain the second noise points, wherein the second color is different from a color of the second region.

10. The apparatus according to claim 6, wherein the processor is further configured to generate a signature of the CAPTCHA code by using a specified encryption algorithm, wherein the signature is used to determine whether an answer that is submitted by a user according to the CAPTCHA image matches the CAPTCHA code.

11. A non-transitory storage medium storing computer readable instructions that, when being executed by one or more processors, cause the one or more processors to perform:
  obtaining an initial image comprising a CAPTCHA code;
  selecting a first region in the initial image, the first region comprising a first part of content of the CAPTCHA code;
  generating first noise points on the CAPTCHA code in the first region using a first noise generation scheme, the first noise generation scheme including rendering multiple first pixels having a second color in the first region into a first color;
  generating second noise points in a second region of the initial image using a second noise generation scheme different from the first noise generation scheme, the second region of the initial image being a region outside the first region of the initial image, the second region comprising a second part of content of the CAPTCHA code, the second noise generation scheme includes rendering multiple second pixels having the first color in the second region into the second color; and
  obtaining a CAPTCHA image by combining the first region having the first noise points and the second region having the second noise points.

12. The storage medium according to claim 11, wherein the computer readable instructions further cause the one or more processors to perform:
  randomly selecting the multiple first pixels on the CAPTCHA code in the first region; and
  rendering the multiple first pixels into the first color to obtain the first noise points, wherein the first color is different from a color of the CAPTCHA code in the first region.

13. The storage medium according to claim 12, wherein the computer readable instructions further cause the one or more processors to perform:
  generating a random number according to a specified random function when a pixel is selected;
  determining whether the random number is greater than a specified value; and
  using the pixel as one of the first pixels when the random number is greater than the specified value.

14. The storage medium according to claim 11, wherein computer readable instructions further cause the one or more processors to perform:
  randomly selecting the multiple second pixels in the second region of the initial image; and
  rendering the multiple second pixels into the second color to obtain the second noise points, wherein the second color is different from a color of the second region.

15. The storage medium according to claim 11, wherein computer readable instructions further cause the one or more processors to perform: generating a signature of the CAPTCHA code by using a specified encryption algorithm, wherein the signature is used to determine whether an answer that is submitted by a user according to the CAPTCHA image matches the CAPTCHA code.

16. The method according to claim 1, wherein:
  the CAPTCHA code in the initial image includes pixels having the second color; and
  a background area in the initial image includes pixels having the first color.

17. The method according to claim 1, wherein:
  the first region is composed of: the first part of content of the CAPTCHA code and a first part of a background area in the initial image; and
  the second region is composed of: the second part of content of the CAPTCHA code and a second part of the background area in the initial image,
  wherein the first part of content of the CAPTCHA code and the second part of content of the CAPTCHA code forms the entire CAPTCHA code.

18. The method according to claim 1, wherein:
  the first region has a preset shape.

* * * * *